United States Patent
Chae et al.

(10) Patent No.: US 9,888,450 B2
(45) Date of Patent: Feb. 6, 2018

(54) METHOD AND APPARATUS FOR DETECTING SYNCHRONIZATION SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/970,203

(22) Filed: Dec. 15, 2015

(65) Prior Publication Data

US 2016/0174174 A1 Jun. 16, 2016

Related U.S. Application Data

(60) Provisional application No. 62/092,799, filed on Dec. 16, 2014.

(51) Int. Cl.
| | |
|---|---|
| *H04W 56/00* | (2009.01) |
| *H04W 76/02* | (2009.01) |
| *H04W 24/00* | (2009.01) |
| *H04W 52/02* | (2009.01) |
| *H04W 92/18* | (2009.01) |

(52) U.S. Cl.
CPC ......... *H04W 56/001* (2013.01); *H04W 24/00* (2013.01); *H04W 52/0216* (2013.01); *H04W 52/0219* (2013.01); *H04W 76/023* (2013.01); *H04W 92/18* (2013.01); *Y02B 60/50* (2013.01)

(58) Field of Classification Search
CPC ............. H04W 24/00; H04W 52/0216; H04W 52/0219; H04W 56/001; H04W 76/023; H04W 92/18; Y02B 60/5037
USPC ........................................................ 370/350
See application file for complete search history.

(56) References Cited

U.S. PATENT DOCUMENTS

| | | | | |
|---|---|---|---|---|
| 7,912,162 | B2 * | 3/2011 | Mueller-Weinfurtner | H04L 31/7087 375/145 |
| 8,259,875 | B2 * | 9/2012 | Lipka | H04L 27/2659 375/229 |
| 8,681,730 | B2 * | 3/2014 | Swarts | H04J 11/0073 370/330 |
| 9,031,124 | B1 * | 5/2015 | Bhat | H04L 27/0014 375/229 |
| 9,065,630 | B1 * | 6/2015 | Xiao | H04L 7/042 |

(Continued)

*Primary Examiner* — Robert Lopata
(74) *Attorney, Agent, or Firm* — Birch, Stewart, Kolasch & Birch, LLP

(57) ABSTRACT

A method of detecting a synchronization signal at a device-to-device (D2D) user equipment (UE) in a wireless communication system includes receiving a primary sidelink synchronization signal (PSSS), determining a normalized carrier frequency offset (CFO) from an initial CFO, determining hypothesis test levels from the normalized CFO, and performing correlation using the received PSSS, a first sequence, a second sequence, a first sequence shifted per hypothesis test level and a second sequence shifted per hypothesis test level. When the number of hypothesis test levels is greater than 1, the shifted first sequence and the shifted second sequence having a complex conjugate relation in a predetermined normalized CFO value are correlated via the same correlator.

12 Claims, 13 Drawing Sheets

(56) References Cited

U.S. PATENT DOCUMENTS

| | | | | |
|---|---|---|---|---|
| 2008/0260085 A1* | 10/2008 | Lin | ..................... | H04L 27/2659 375/362 |
| 2010/0182979 A1* | 7/2010 | Malladi | ................ | H04J 11/0069 370/336 |
| 2010/0279707 A1* | 11/2010 | Fischer | ................... | G01S 5/021 455/456.1 |
| 2011/0026648 A1* | 2/2011 | Swarts | ................. | H04J 11/0086 375/343 |
| 2011/0237214 A1* | 9/2011 | Swarts | ................. | H04W 56/00 455/226.1 |
| 2011/0255394 A1* | 10/2011 | Zha | ..................... | H04J 11/0069 370/203 |
| 2011/0255864 A1* | 10/2011 | Cao | ..................... | H04L 27/2659 398/25 |
| 2013/0044686 A1* | 2/2013 | Yen | ........................ | H04W 56/00 370/328 |
| 2013/0142060 A1* | 6/2013 | Challa | ................ | H04B 1/70755 370/252 |
| 2013/0259024 A1* | 10/2013 | Zhang | ................. | H04J 11/0073 370/350 |
| 2015/0208369 A1* | 7/2015 | Chiueh | ............... | H04W 56/001 370/350 |
| 2016/0020876 A1* | 1/2016 | Raghavan | ............ | H04L 5/0023 370/252 |
| 2017/0026965 A1* | 1/2017 | Ode | ..................... | H04W 16/32 |
| 2017/0105090 A1* | 4/2017 | Batra | ..................... | H04W 4/008 |

* cited by examiner

FIG. 5
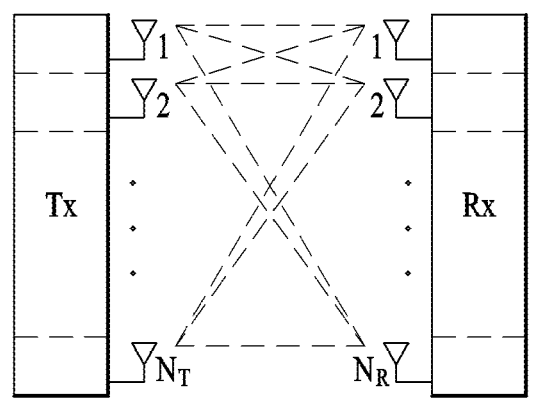
(a)
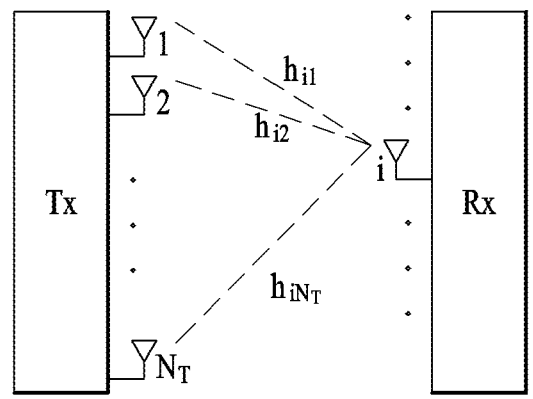
(b)

FIG. 8
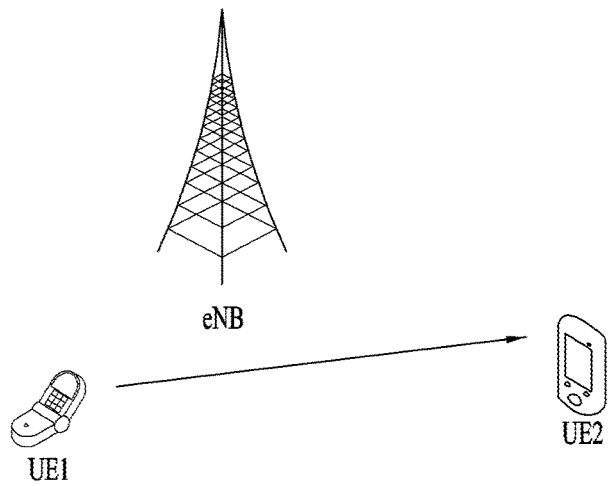
(a)
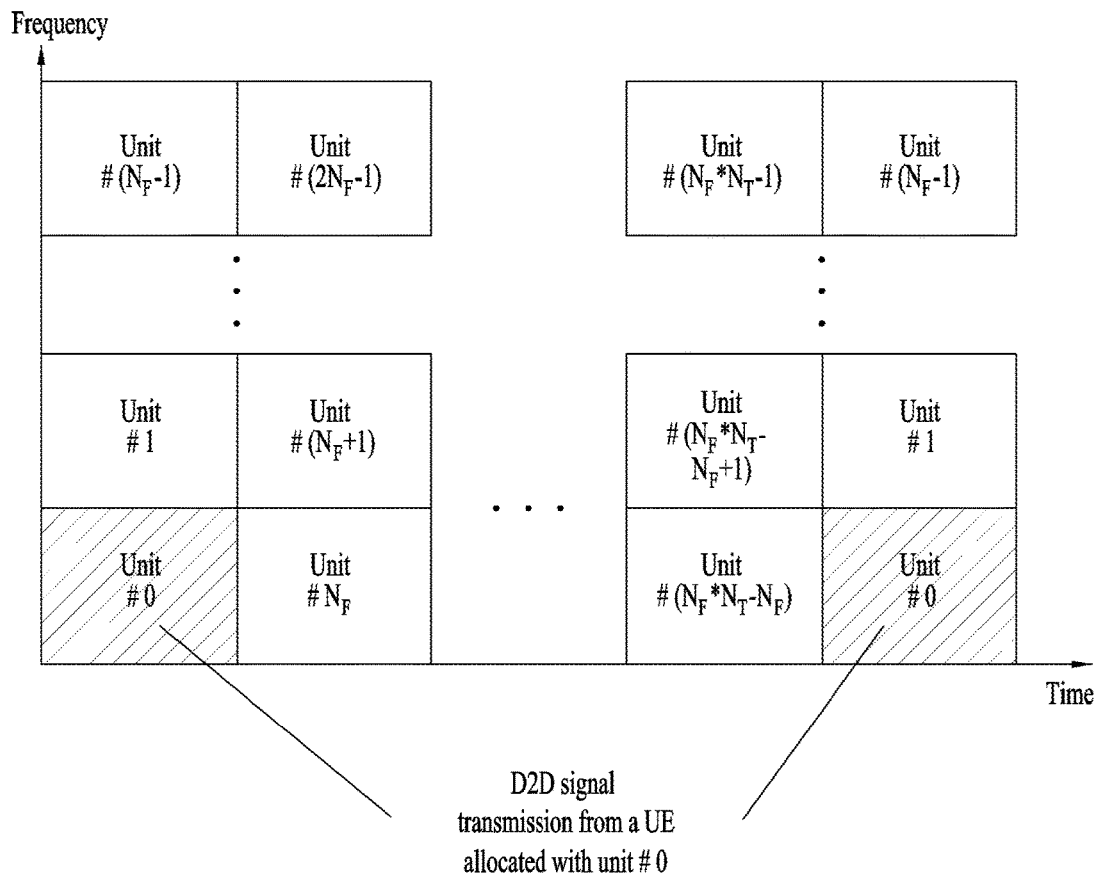
(b)

(a) Downlink PSS subcarrier mapping (b) D2D PSS subcarrier mapping

FIG. 16
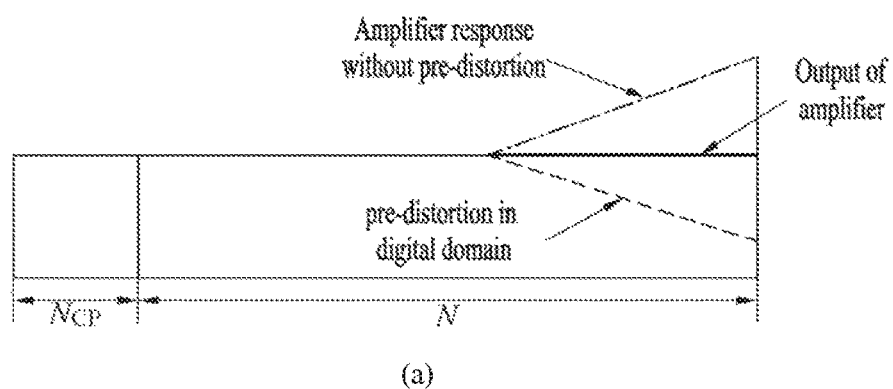
(a)
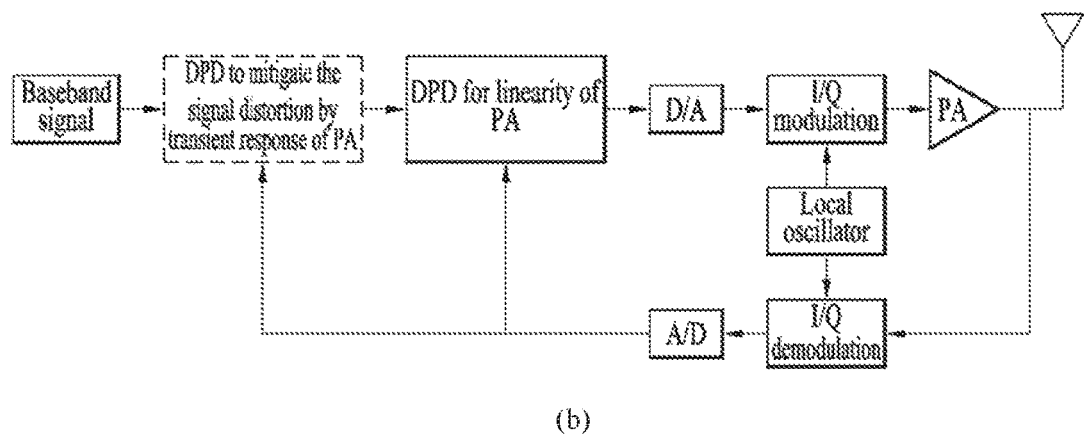
(b)

METHOD AND APPARATUS FOR DETECTING SYNCHRONIZATION SIGNAL IN WIRELESS COMMUNICATION SYSTEM

CROSS-REFERENCE TO RELATED APPLICATIONS

This application claims the benefit of U.S. Provisional Application No. 62/092,799, filed on, Dec. 16, 2014 which is hereby incorporated by reference as if fully set forth herein.

BACKGROUND OF THE INVENTION

Field of the Invention

The following description relates to a wireless communication system, and more particularly, to a method and apparatus for detecting a synchronization signal in an initial carrier frequency offset environment.

Discussion of the Related Art

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

SUMMARY OF THE INVENTION

Accordingly, the present invention is directed a method and apparatus for detecting a synchronization signal that substantially obviates one or more problems due to limitations and disadvantages of the related art.

An object of the present invention is to provide a method for detecting a D2D synchronization signal in an initial carrier frequency offset environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of detecting a synchronization signal at a device-to-device (D2D) user equipment (UE) in a wireless communication system includes receiving a primary sidelink synchronization signal (PSSS), determining a normalized carrier frequency offset (CFO) from an initial CFO, determining hypothesis test levels from the normalized CFO, and performing correlation using the received PSSS and at least one of a first sequence, a second sequence, a first sequence shifted per hypothesis test level or a second sequence shifted per hypothesis test level, wherein, when the number of hypothesis test levels is greater than 1, the shifted first sequence and the shifted second sequence having a complex conjugate relation in a predetermined normalized CFO value are correlated via the same correlator.

In another aspect of the present invention, a device-to-device (D2D) user equipment (UE) apparatus for detecting a synchronization signal in a wireless communication system includes a reception device and a processor, wherein the processor is configured to receive a primary sidelink synchronization signal (PSSS), to determine a normalized carrier frequency offset (CFO) from an initial CFO, to determine hypothesis test levels from the normalized CFO and to perform correlation using the received PSSS and at least one of a first sequence, a second sequence, a first sequence shifted per hypothesis test level or a second sequence shifted per hypothesis test level, and wherein, when the number of hypothesis test levels is greater than 1, the shifted first sequence and the shifted second sequence having a complex conjugate relation in a predetermined normalized CFO value are correlated via the same correlator.

The shifted first sequence and the shifted second sequence may satisfy the following equation:

$$e^{j\frac{2\pi k(1-\alpha)}{N}} D_{37}^{UL}(k) = \left(e^{j\frac{2\pi k \cdot \alpha}{N}} D_{26}^{UL}(k)\right)^*$$

where, $D_{26}^{UL}(k)$ denotes the first sequence, $D_{37}^{UL}(k)$ denotes the second sequence, and $\alpha$ denotes the normalized CFO value.

The first and second sequences shifted by a smallest value among the hypothesis test levels should be correlated via different correlators.

The initial CFO may be determined according to bandwidth used for D2D signal transmission.

The normalized CFO may correspond to (the initial CFO/a subcarrier spacing).

The hypothesis test level may be an integer in the normalized CFO range.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram showing the configuration of a wireless communication system having multiple antennas;

FIG. 8 is a diagram showing an example of a D2D resource pool for D2D communication;

FIGS. 14 to 16 are diagrams explaining a gain control method according to one embodiment of the present invention.

DETAILED DESCRIPTION OF THE INVENTION

Figure 1:
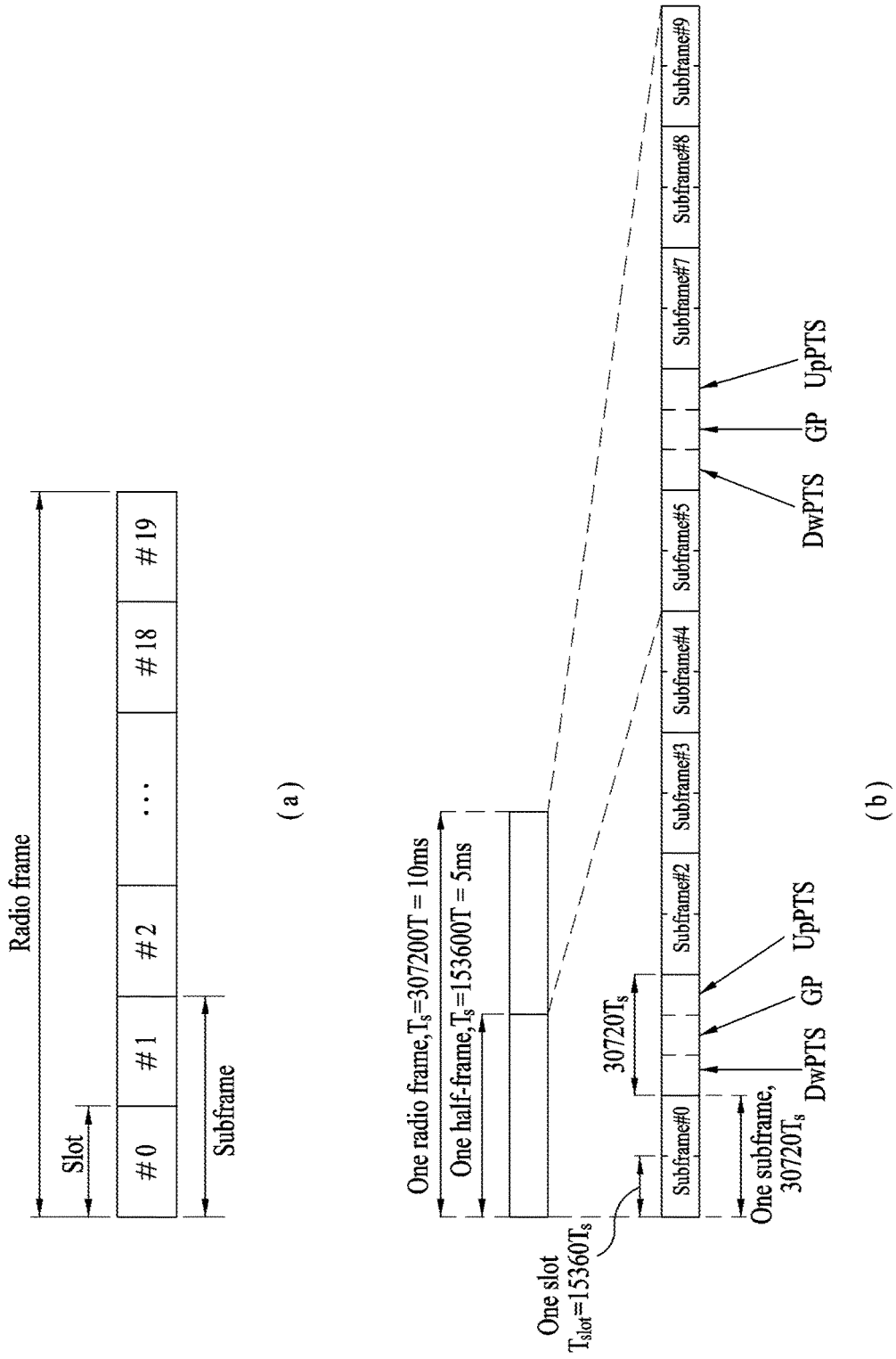
FIG. 1 is a diagram showing the structure of a radio frame.

Reference will now be made in detail to the preferred embodiments of the present disclosure, examples of which are illustrated in the accompanying drawings. Wherever possible, the same reference numbers will be used throughout the drawings to refer to the same or like parts. The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes.

One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
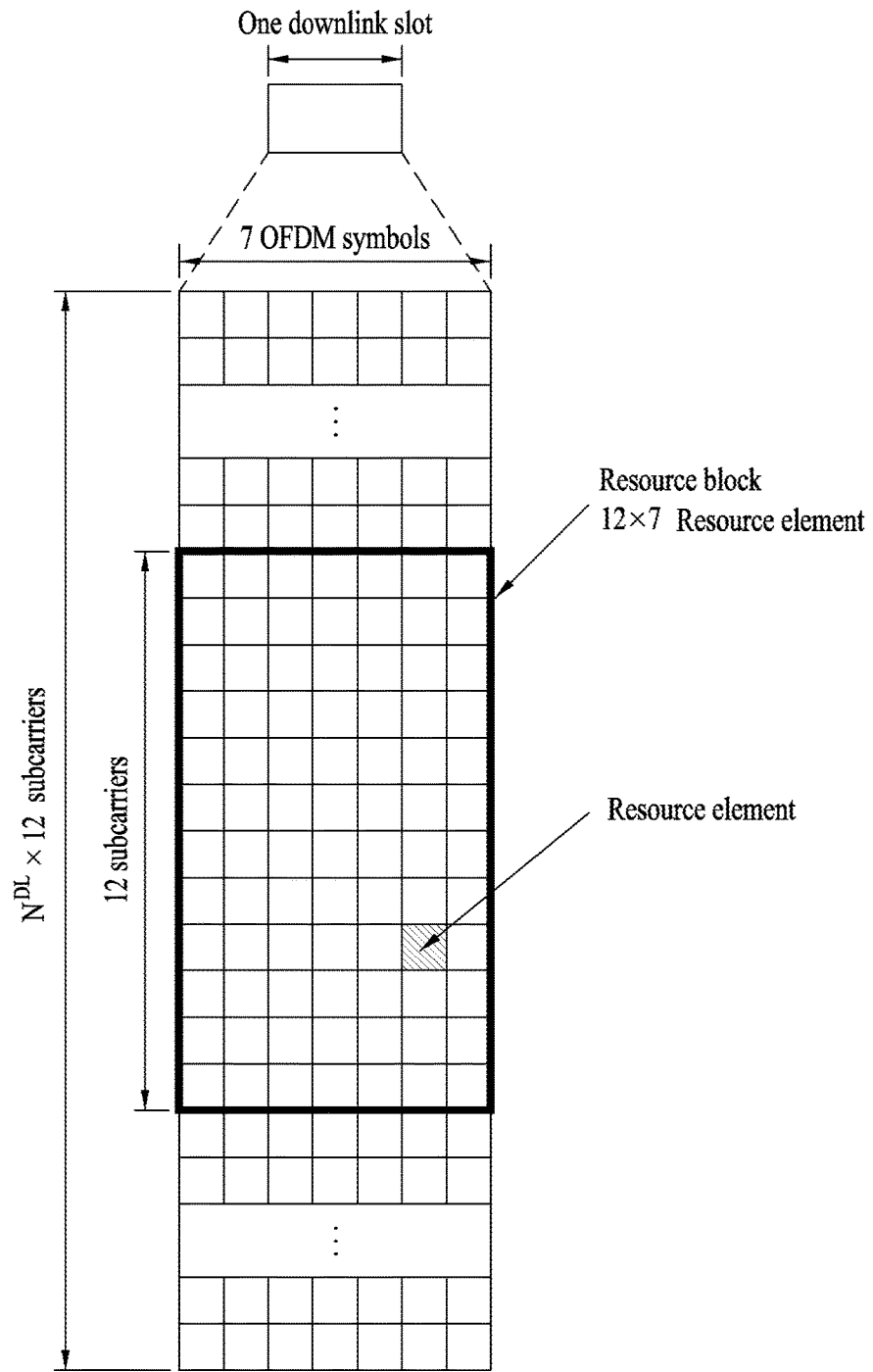
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
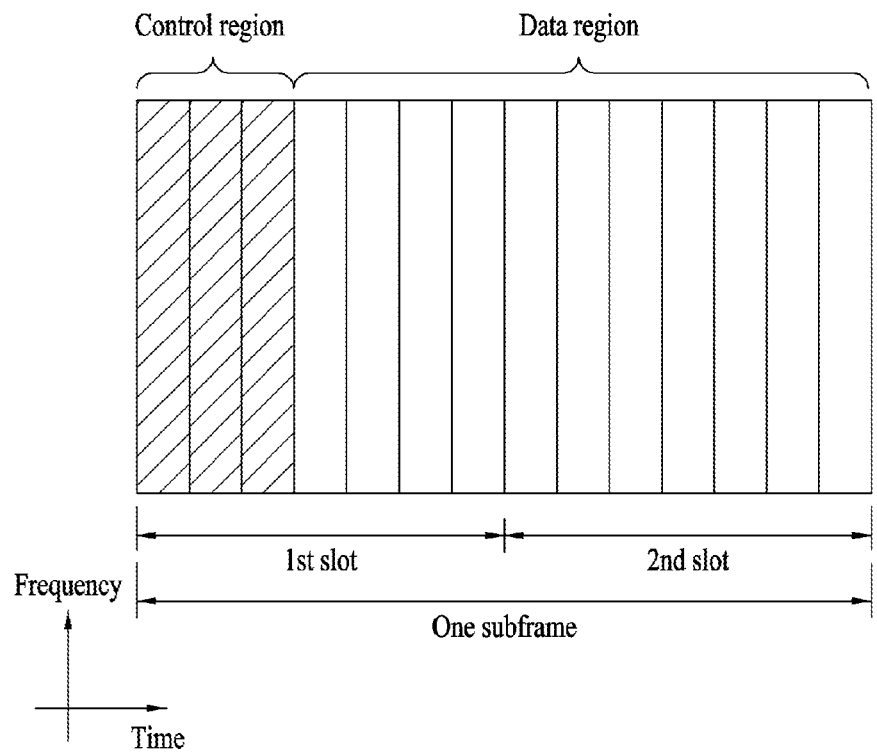
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. if the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
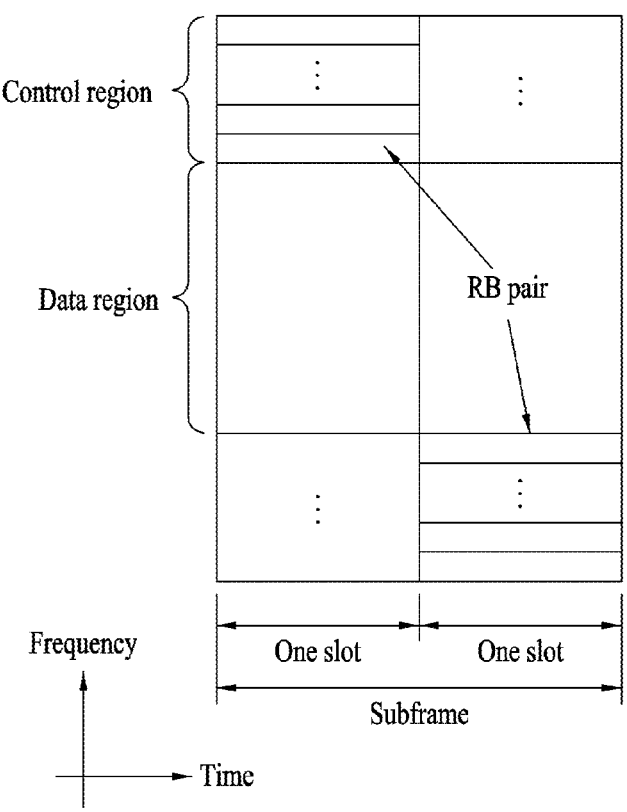
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

MIMO System Modeling

FIG. 5 illustrates the configuration of a communication system including multiple antennas.

Referring to FIG. 5(*a*), when both the number of Tx antennas and the number of Rx antennas respectively to NT and NR, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate Ro that may be achieved with a single antenna, the transmission rate may be increased, in theory, to the product of Ro and a transmission rate increase rate Ri illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as 3rd generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that NT Tx antennas and NR Rx antennas are present.

Regarding a transmission signal, up to NT pieces of information can be transmitted through the NT Tx antennas, as expressed as the following vector.

$$S = [S_1, S_2, \ldots, S_{N_T}]^T \quad \text{[Equation 2]}$$

A different transmission power may be applied to each piece of transmission information, $S_1, S_2, \ldots, S_{N_T}$. Let the transmission power levels of the transmission information be denoted by $P_1, P_2, \ldots, P_{N_T}$, respectively. Then the transmission power-controlled transmission information vector is given as follows.

$$\hat{S} = [\hat{S}_1, \hat{S}_2, \ldots, \hat{S}_{N_T}]^T = [Ps_1, Ps_2, \ldots, Ps_{N_T}]^T \quad \text{[Equation 3]}$$

The transmission power-controlled transmission information vectors $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WPs$$

Herein, $w_{ij}$ denotes a weight between an ith Tx antenna and a jth piece of information. W is called a weight matrix or a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T$$ [Equation 6]

When channels are modeled in the MIMO communication system, they may be distinguished according to the indexes of Tx and Rx antennas and the channel between a jth Tx antenna and an ith Rx antenna may be represented as hij. It is to be noted herein that the index of the Rx antenna precedes that of the Tx antenna in hij.

FIG. 5(b) illustrates channels from NT Tx antennas to an ith Rx antenna. The channels may be represented as vectors and matrices by grouping them. As illustrated in FIG. 5(b), the channels from the NT Tx antennas to an ith Rx antenna may be expressed as follows.

$$h_i^T = [h_{i1}, h_{i2}, \ldots, h_{iN_T}]$$ [Equation 7]

Also, all channels from the NT Tx antennas to the NR Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the NR Rx antennas is given as the following vector.

$$n = [n_1, n_2, \ldots, n_{N_R}]^T$$ [Equation 9]

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} +$$ [Equation 10]

$$\begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows is identical to that of Rx antennas, NR and the number of columns is identical to that of Tx antennas, NT. Thus, the channel matrix H is of size NR×NT.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R)$$ [Equation 11]

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Synchronization Acquisition of D2D UE

Hereinafter, synchronization acquisition between UEs in D2D communication will be described based on the above description and the legacy LTE/LTE-A system. In an OFDM system, when time/frequency synchronization is not performed, multiplexing between different UEs in OFDM signals may become impossible due to inter-cell interference. D2D UEs directly transmitting and receiving synchronization signals to individually perform synchronization is inefficient. Accordingly, in a distributed node system such as D2D, a specific node transmit a representative synchronization signal and the remaining UEs may perform synchronization. In other words, for D2D signal transmission and reception, a method of transmitting a D2D synchronization signal (D2DSS) at some nodes (at this time, the node may be referred to as an eNB, a UE, a synchronization reference node (SRN) or a synchronization source) and performing synchronization to transmit and receive signals at the remaining UEs may be used.

Figure 6:
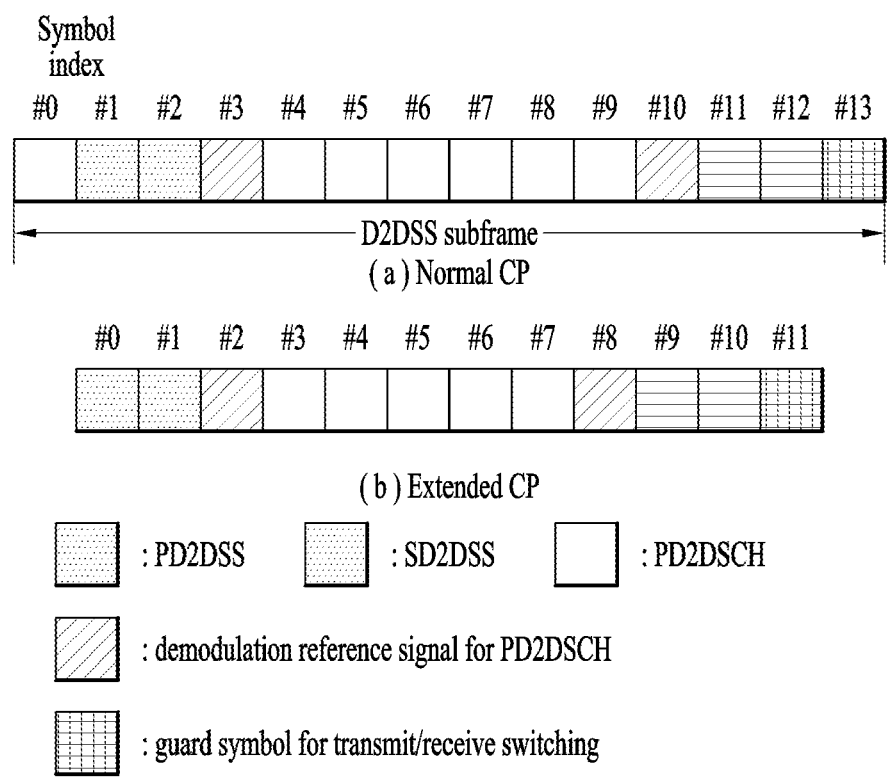
FIG. 6 is a diagram showing a subframe on which a D2D synchronization signal is transmitted.

The D2D synchronization signal may include a primary D2DSS or primary sidelink synchronization signal (PSSS) and a secondary D2DSS (SD2DSS) or secondary sidelink synchronization signal (SSSS). The PD2DSS may be a Zadoff-Chu sequence having a predetermined length or a similar/modified/repeated structure of a PSS. Unlike the DL PSS, another Zadoff-Chu root index (e.g., 26 or 37) may be used. The SD2DSS may be an M-sequence or a similar/modified/repeated structure of an SSS. If UEs perform synchronization with an eNB, an SRN becomes an eNB and a D2DSS becomes a PSS/SSS. Unlike the PSS/SSS of DL, the PD2DSS/SD2DSS follows a UL subcarrier mapping method. FIG. 6 shows a subframe on which a D2D synchronization signal is transmitted. A physical D2D synchronization channel (PD2DSCH) may be a (broadcast) channel, via which basic (system) information, of which a UE should be aware before D2D signal transmission and reception, (e.g., D2DSS related information, a duplex mode (DM), a TDD UL/DL configuration, resource pool related information, the type of an application related to the D2DSS, a subframe offset, broadcast information, etc.) is transmitted. The PD2DSCH may be transmitted on the same subframe as the D2DSS or a subsequent subframe thereof. The DMRS may be used for PD2DSCH demodulation.

The SRN may be a node for transmitting a D2DSS and a PD2DSCH. The D2DSS may be a specific sequence and the PD2DSCH may be a sequence indicating specific information or a codeword after being subjected to predetermined channel coding. The SRN may be an ENB or a specific D2D UE. In case of partial network coverage or out-of-network coverage, a UE may become an SRN.

Figure 7:
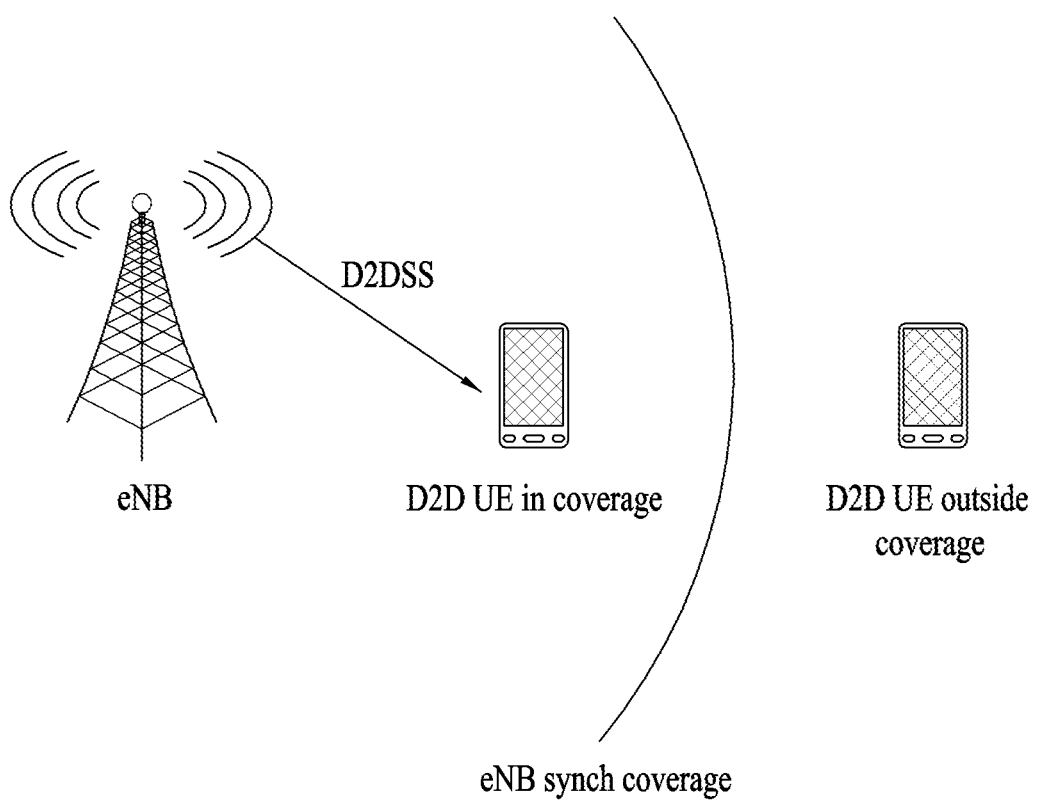
FIG. 7 is a diagram explaining relaying of a D2D signal.

In a situation shown in FIG. 7, the D2DSS may be relayed for D2D communication with an out-of-coverage UE. In addition, the D2DSS may be relayed via multi-hop. In the following description, relaying of the synchronization signal includes direct AF relaying of the synchronization signal of the eNB or transmission of a D2D synchronization signal of a specific format at synchronization signal reception timing. By relaying the D2D synchronization signal, UE in coverage and UE outside coverage can perform D2D communication.

D2D Resource Pool

FIG. 8 shows UE1 and UE2 for performing D2D communication and an example of a D2D resource pool used by the UEs. In FIG. 8(a), a UE means a terminal or a network apparatus such as an eNB for transmitting and receiving a signal according to a D2D communication scheme. The UE may select a resource unit corresponding to a specific resource from the resource pool meaning a set of resources and transmit a D2D signal using the resource unit. A reception UE UE2 may receive the configuration of the resource pool used for UE1 to transmit the signal and detect the signal of UE1 within the pool. Here, the resource pool may be signaled by the eNB when UE1 is in coverage of the eNB and may be signaled by another UE or determined to a predetermined resource when UE1 is outside coverage of the eNB. In general, the resource pool is composed of a plurality of resource units and each UE may select one or a plurality of resource units to be used for D2D signal transmission. The resource unit is shown in FIG. 8(b). Referring to FIG. 8(b), all frequency resources are divided into NF resource units and all time resources are divided into NT resource units such that a total of NF*NT resource units is defined. The resource pool may be repeated at a period of NT subframes. In particular, one resource unit may periodically and repeatedly appear as shown. In order to obtain diversity effects in time or frequency, the index of a physical resource unit to which one logical resource unit is mapped may be changed with time with a predetermined pattern. In the structure of the resource unit, the resource pool may mean a set of resource units which may be used for transmission by the UE for transmitting the D2D signal.

The resource pool may be subdivided into several types. For example, the resource pool may be divided according to content of the D2D signal transmitted in each resource pool. For example, the content of the D2D signal may be divided and each resource pool may be configured with respect to the content of the D2D signal. As the content of the D2D signal, scheduling assignment (SA), a D2D data channel and a discovery channel may be used. SA may be a signal including a modulation and coding scheme (MCS) or MIMO transmission scheme necessary for demodulation of the location of a resource used for transmission of D2D data channel subsequently performed by each transmission UE and the other data channel, and timing advance (TA). This signal may be multiplexed and transmitted with the D2D data on the same resource unit. In this case, the SA resource pool may mean the pool of resources multiplexed and transmitted with the D2D data. SA may be referred to as a D2D control channel or a physical sidelink control channel (PSCCH). The D2D data channel (or the PSSCH) may be a pool of resources used for transmission of user data by a transmission UE. If SA is multiplexed and transmitted with D2D data on the same resource unit, in the resource pool for the D2D data channel, only the D2D data channel excluding SA information may be transmitted. In other words, resource elements (REs) used to transmit the SA information on an individual resource unit in the SA resource pool may be used to transmit D2D data in the D2D data channel resource pool. The discovery channel may be a resource pool for a message for enabling a neighboring UE to find a transmission UE by transmitting information such as an ID at the transmission UE.

Even when the content of the D2D signal is the same, different resource pools may be used according to transmission and reception attributes of the D2D signal. For example, even the same D2D data channel or discovery message may be divided into different resource pools according to the transmission timing determination method of the D2D signal (e.g., whether transmission is performed at the reception timing of the synchronization reference signal or whether transmission is performed by applying predetermined timing advance), a resource assignment method (e.g., whether the eNB specifies the transmission resource of an individual signal with respect to an individual transmission UE or whether the individual transmission UE autonomously selects the individual signal transmission resource from the pool), signal format (e.g., the number of symbols occupied by each D2D signal in one subframe or the number of subframes used to transmit one D2D signal), the intensity of the signal from the eNB, the intensity of the transmit power of the D2D UE, etc. For convenience of description, a method of, at the eNB, directly indicating the transmission resource of the D2D transmission UE in D2D communication is referred to as Mode 1 and a method of, at the UE, directly indicating the transmission resource in a state in which a transmission resource region is predetermined or the eNB specifies the transmission resource region is referred to as Mode 2. In case of D2D discovery, the case in which the eNB directly indicates the resource is referred to as Type 2 and the case in which the UE directly selects the transmission resource in the predetermined resource region or the resource region indicated by the eNB is referred to as Type 1.

Transmission and Reception of SA

Mode 1 UE may transmit SA (or D2D control signal or sidelink control information (SCI)) via resources configured by the eNB. Mode 2 UE receives resources to be used for D2D transmission, which is configured by the eNB. A time/frequency resource may be selected from the configured resources to transmit SA.

Figure 9:
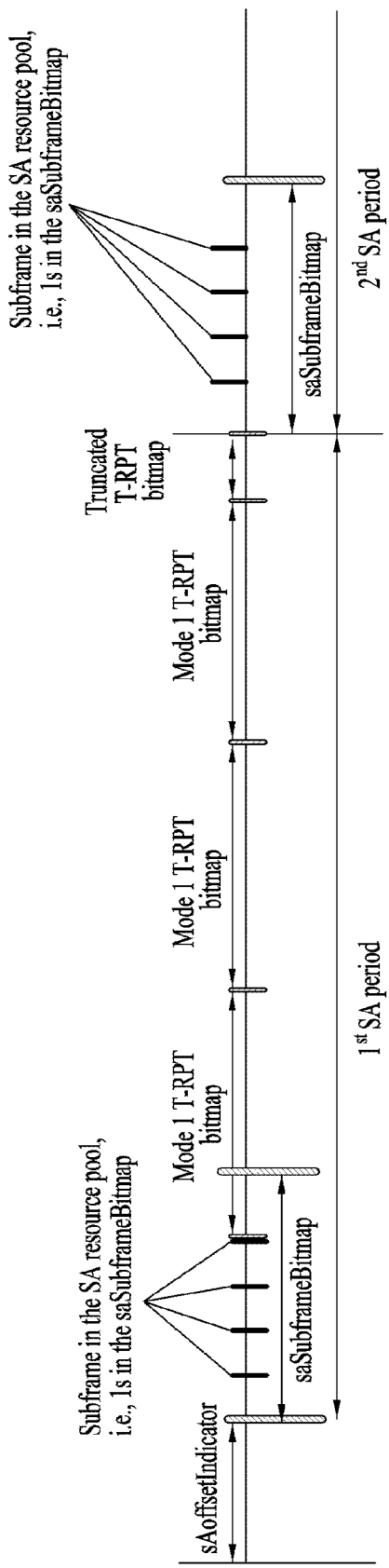
FIG. 9 is a diagram illustrating an SA period.

An SA period may be defined as shown in FIG. 9. Referring to FIG. 9, a first SA period may start at a subframe separated from a specific system frame by a predetermined SAOffsetIndicator indicated by higher layer signaling. Each SA period may include an SA resource pool and a subframe pool for D2D data transmission. The SA resource pool may include a first subframe of the SA period and a last subframe of subframes on which SA is transmitted in saSubframeBitmap. In the resource pool for D2D data transmission, in case of mode 1, time-resource pattern for transmission (T-RPT) is applicable such that a subframe used for real data transmission may be determined. As shown, when the number of subframes included in the SA period excluding the SA resource pool is greater than the number of T-RPT bits, the T-RPT may be repeatedly applied and a lastly applied T-RPT may be truncated and applied by the remaining number of subframes.

D2D Synchronization Signal Detection Method

Hereinafter, a D2D synchronization signal detection method according to an embodiment of the present invention will be described based on the above description. A large range of an initial carrier frequency offset (CFO) among out-of-coverage D2D UEs (up to ±20 ppm) may occur. If the initial (large range of) CFO occurs, a PSSS may be detected via a hypothesis test. That is, a sequence frequency-shifted according to each hypothesis test level and a received sequence are correlated and the PSSS is detected via the result. Here, the hypothesis test may correspond to a method of assuming that CFO was occurred at a hypothesis which has largest peak. The largest peak is found from correlation of received sequence with each sequences which are generated under assumption that CFO is occurred.

The UE according to one embodiment of the present invention may receive a PSSS and determine a normalized CFO from the initial CFO. From the normalized CFO, a hypothesis test level may be determined.

The initial CFO may be determined according to bandwidth used for D2D signal transmission, the normalized CFO may correspond to (initial CFO/subcarrier spacing) and the hypothesis test level may be an integer in a normalized CFO range. More specifically, for example, according to European Telecommunications Standards Institute: 3GPP TR 36.877 V0.1.0 (2014-10), http://www.3gpp.org/DynaReport/36877.htm, band 7 (UL: 2500 MHz-2570 MHz) is included in PS bands and the initial CFO is +/−50 kHz. This initial CFO may be +/−3.33(=50K/15K, that is, 15 KHz subcarrier spacing) normalized CFO. In this case, the hypothesis test level may be 7, [−3, −2, −1, 0, 1, 2, 3]. The UE may correlate the sequences frequency-shifted according to seven hypothesis test levels and the received signal to detect the synchronization signal. If the number of PSSS is 2, 14 correlations are needed. If serial processing for correlations are used, processing delay may occurs. If parallel processing for correlations are used, complexity for UE implementation is increased to implement additional correlator. That is, if hypothesis is adopted due to initial CFO, processing delay or complexity of UE implementation may increase. According to the embodiment of the present invention, using the property in which the below-described UL PSSS has one subcarrier frequency shift and complex conjugate relation between two ZC sequences, correlation may be performed using the received PSSS, a first sequence, a second sequence, a first sequence shifted per hypothesis test level and a second sequence shifted per hypothesis test level. If the number of hypothesis test levels is greater than 1, the shifted first sequence and the shifted second sequence having the complex conjugate relation in a predetermined normalized CFO value may be correlated via the same correlator. Here, the shifted first sequence and the shifted second sequence may satisfy Equation 12 below.

$$e^{j\frac{2\pi k(1-\alpha)}{N}} D_{37}^{UL}(k) = \left(e^{j\frac{2\pi k \cdot \alpha}{N}} D_{26}^{UL}(k)\right)^* \quad \text{Equation 12}$$

Figure 10:
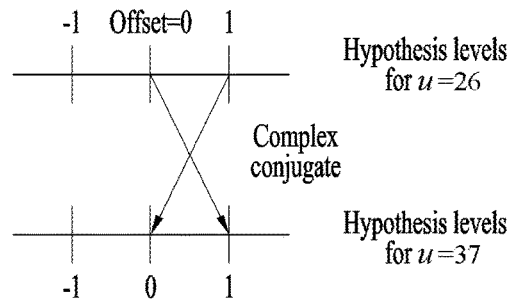
FIG. 10 is a diagram showing a relation between a hypothesis test level and a complex conjugate according to one embodiment of the present invention.
Figure 11:
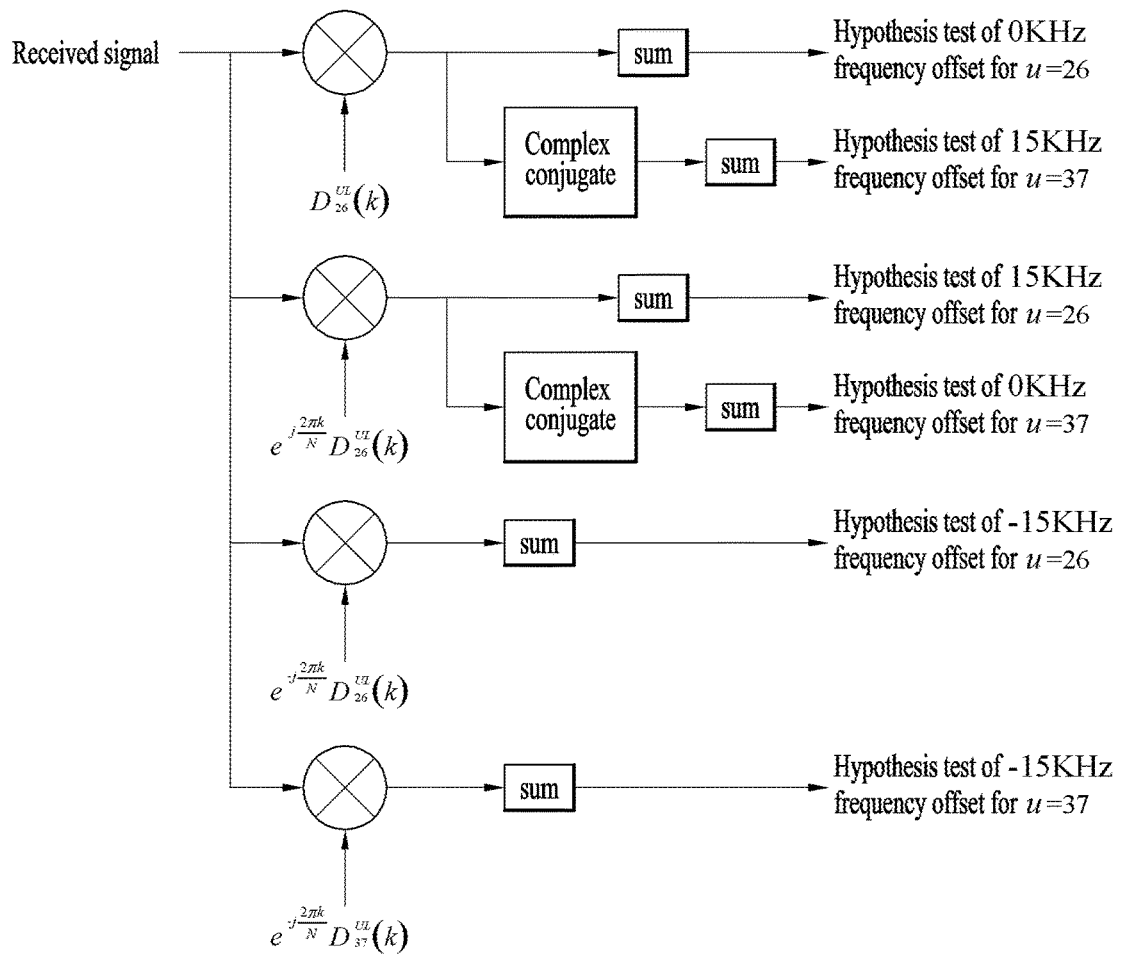
FIG. 11 schematically shows how correlation of the received signal is performed.

$D_{26}^{UL}(k)$ denotes the first sequence, $D_{37}^{UL}(k)$ denotes the second sequence, and $\alpha$ denotes the normalized CFO value. For example, as shown in FIG. 10, when the hypothesis test level is −1, 0 and 1 and the normalized CFO value is 0, the non-frequency-shifted first sequence (that is, the first sequence) and the second sequence frequency-shifted by one subcarrier have a complex conjugate relation. Accordingly, correlation may be performed via the same correlator. Therefore, correlation result of other sequence is acquired by performing sample multiplying operation and complex conjugate operation. That is, the number of correlator may be reduced in parallel processing (simultaneous operation for each hypothesis test level). And the processing delay may be reduced because the number of correlation operation may be reduced in serial processing (sequential operation for each hypothesis test level with saving received signal with respect to each hypothesis test level). In case of $\alpha=1$, the first sequence shifted by one subcarrier and the non-frequency-shifted second sequence have a complex conjugate relation and may be correlated by one correlator. The first and second sequences shifted by a smallest value among the hypothesis test levels do not have the complex conjugate relation and thus should be correlated via different correlators. Accordingly, instead of six correlators in a 3-level hypothesis test of FIG. 10, a total of four correlators including two correlators for correlation between the first and second sequences frequency-shifted by −1 which is a smallest value of the hypothesis test level and the received signal and two correlators for correlating the sequences having the complex conjugate relation and the received signal are necessary. FIG. 11 schematically shows how correlation of the received signal is performed.

Figure 12:
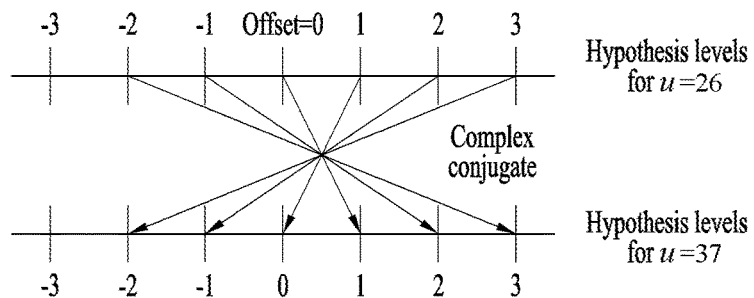
FIG. 12 shows a frequency shift version of a first sequence and a second sequence having a complex conjugate relation in each of seven hypothesis test levels using an arrow.

FIG. 12 shows a frequency shift version of a first sequence (root index u=26) and a second sequence (=37) having a complex conjugate relation in each of seven hypothesis test levels (expressed by an offset value) using an arrow. In case of 7 levels, two correlators for the first and second sequences frequency-shifted by −3 which is a smallest level among the hypothesis test levels and six correlators for processing the first sequence frequency-shifted at each of levels −2, −1, 0, 1, 2 and 3 and the second sequence having the complex conjugate relation therewith are required. Therefore, a total of eight correlators is required. Accordingly, 43% of the correlators are saved as compared to the case in which a total of 14 correlators is required when the present invention is not applied. Table 1 below shows the efficiency of the present invention according to the hypothesis test level.

TABLE 1

| | Independent Matched filtering | Proposed design | Savings (%) |
|---|---|---|---|
| 1-level hypothesis | 256 | 256 | 0 |
| 3-level hypothesis | 768 | 512 | 33.3 |
| 5-level hypothesis | 1280 | 768 | 40 |
| 7-level hypothesis | 1792 | 1024 | 43 |

In the proposed method, the hypothesis level may be implemented such that a subcarrier spacing or a multiple of the subcarrier spacing (15 kHz) is necessarily included in one hypothesis level. Alternatively, if a detector for hypothesis of a non-integer multiple of frequency offset (alpha) is configured with respect to the sequence of a specific root index using Equation 12, the PD2DSS having a relationship of root index+x=63 configures the detector for 1-alpha hypothesis using the complex conjugate.

Figure 13:
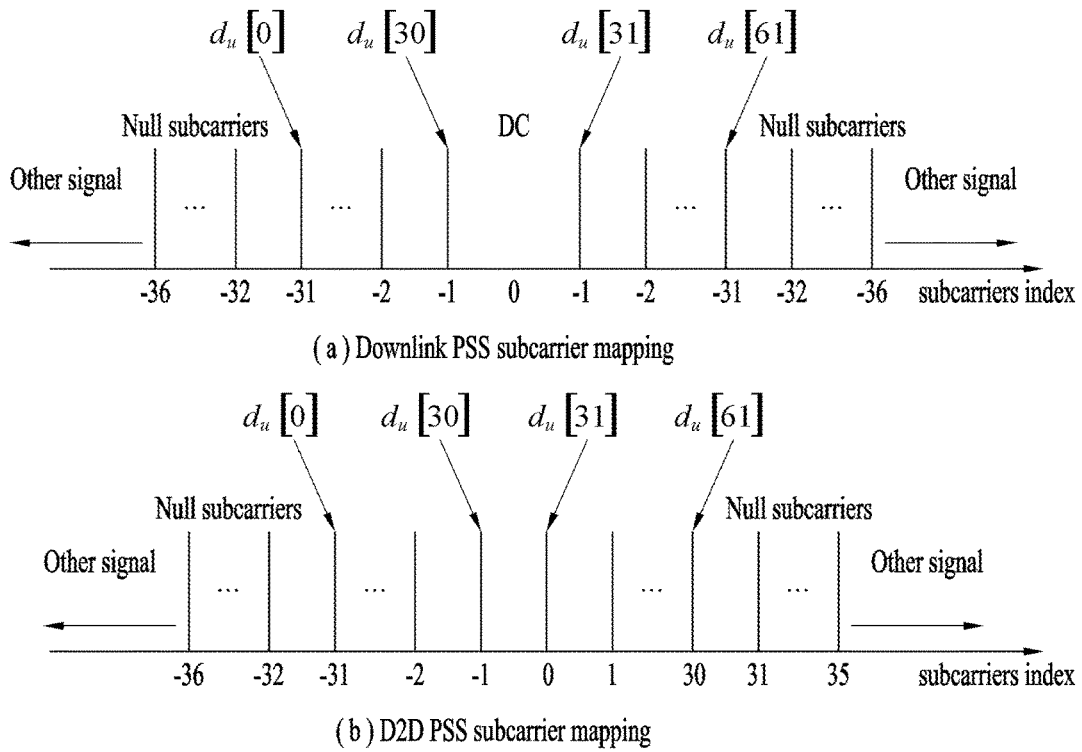
FIG. 13 is a diagram showing mapping of a D2D synchronization signal.
Figure 14:
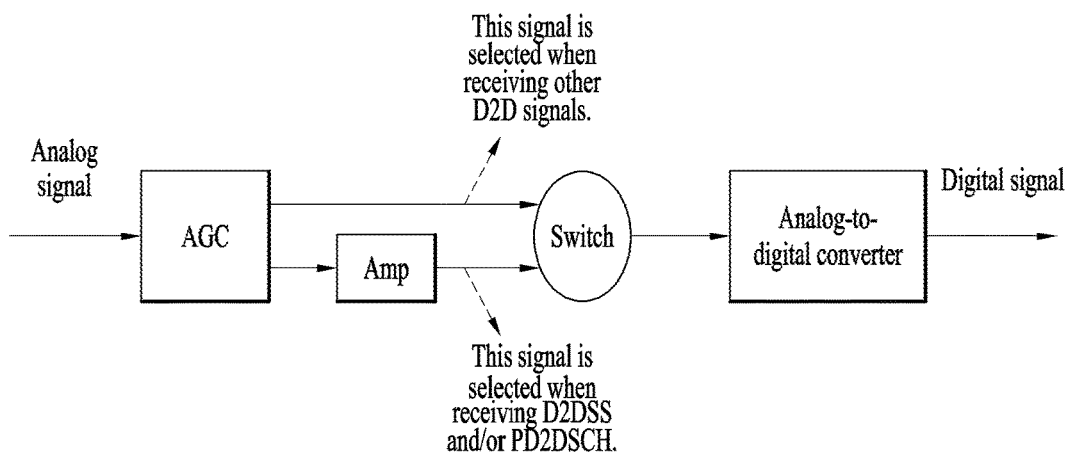

The synchronization signal detection method according to the embodiment of the present invention is based on the property that the UL PSSS is mapped to the DC subcarrier when being mapped to the subcarrier as shown in FIG. 13(*b*) (the DL PSSS is not mapped to the DC subcarrier as shown in FIG. 13(*a*)) and the UL PSSS has one subcarrier frequency shift and complex conjugate relation between two ZC sequences. The following description will be given in order to prove this property.

Let us consider PD2DSS in time domain generated by the N-point IFFT, $$D_u^{UL}(k) = \frac{1}{N} \sum_{n=0}^{N} s_u^{UL}(n) e^{j\frac{2\pi kn}{N}} \quad \text{[equation 12]}$$

where $s_u^{UL}(n) = [0, \ldots, 0, d_u(0), \ldots, d_u(31), d_u(31), \ldots, d_u(61), 0, \ldots, 0]$ denotes frequency domain sequence mapped to UL subcarrier. Note that a half subcarrier shift between UL and DL is not considered in baseband signal generation, that can be considered in up conversion.

For analysis, let us use equation 13 as follows, $$D_u^{DL}(k) = \frac{1}{N} \sum_{n=0}^{N} s_u^{DL}(n) e^{j\frac{2\pi kn}{N}} \quad \text{[equation 13]}$$

$$= \underbrace{\frac{1}{N} \sum_{n=0}^{N/2-1} a_u(n) e^{j\frac{2\pi kn}{N}}}_{=A_u(k)} + \underbrace{\frac{1}{N} \sum_{n=N/2}^{N/2-1} b_u(n) e^{j\frac{2\pi kn}{N}}}_{B_u(k)}$$

$$= A_u(k) + B_u(k),$$

where $a_u(n) =$ $$\left[ \underbrace{0, \cdots, 0}_{N/2-32}, d_u(0), \cdots, d_u(31), \underbrace{0, \cdots, 0}_{32}, \underbrace{0, \cdots, 0}_{N/2-33} \right],$$

and $b_u(n) =$ $$\left[ \underbrace{0, \cdots, 0}_{N/2-32}, \underbrace{0, \cdots, 0}_{32}, 0, d_u(0), \cdots, d_u(31), \underbrace{0, \cdots, 0}_{N/2-33} \right].$$

From time reversal property of FFT operation, since $b_u(n) = a_u(\langle -n \rangle_N)$, $B_u(k) = A_u(\langle -k \rangle_N)$. We can rewrite equation 13 as function of Au(k) as follows, $$D_u^{UL}(k) = \frac{1}{N} \sum_{n=0}^{N} s_u^{UL}(n) e^{j\frac{2\pi kn}{N}}$$

$$= \frac{1}{N} \sum_{n=0}^{N/2-1} a(n) e^{j\frac{2\pi kn}{N}} + \frac{1}{N} \sum_{n=N/2}^{N/2-1} b(n+1) e^{j\frac{2\pi kn}{N}}$$

$$= A_u(k) + \frac{1}{N} \sum_{n=N/2}^{N/2-1} a_u(-\langle n+1 \rangle_N) e^{j\frac{2\pi kn}{N}}$$

$$= A_u(k) + e^{j\frac{2\pi k}{N}} A_u(\langle -k \rangle_N).$$

Note that UL subcarrier mapping of ZC sequence for PD2DSS is effectively minus one subcarrier shift only for positive frequency coefficients of PSS.

Let us consider the relation of PD2DSS sequences of u=26 and u=37. Our analysis can be summarized as following lemma of:

Lemma: For two PD2DSS sequences $s_{26}^{UL}(n)$ and $s_{37}^{UL}(n)$, the time domain signals have following relation, $$D_{37}^{UL}(k) = \left( e^{j\frac{2\pi k}{N}} D_{26}^{UL}(k) \right)^*.$$

Proof) From rewriten equation 13, we have $$D_{26}^{UL}(k) = A_{26}(k) + e^{-j\frac{2\pi k}{N}} A_{26}(\langle -k \rangle_N)$$

Here, we use complex conjugation property of FFT operation. If $g(n) = x^*(n)$, then $G(k) = X^*(\langle -k \rangle_N)$.

Since $a_{37}(n) = a_{26}^*(n)$, we have $A_{37}(k) = A_{26}^*(\langle -k \rangle_N)$.

therefore, $$D_{37}^{UL}(k) = A_{37}(k) + e^{j\frac{2\pi k}{N}} A_{37}(\langle -k \rangle_N)$$

$$= A_{26}^*(\langle -k \rangle_N) + e^{j\frac{2\pi k}{N}} A_{26}^*(k)$$

$$= e^{j\frac{2\pi k}{N}} \left( A_{26}^*(k) + e^{-j\frac{2\pi k}{N}} A_{26}^*(\langle -k \rangle_N) \right)$$

$$= \left( e^{j\frac{2\pi k}{N}} \left( A_{26}(k) + e^{-j\frac{2\pi k}{N}} A_{26}(\langle -k \rangle_N) \right) \right)^*$$

$$= \left( e^{j\frac{2\pi k}{N}} D_{26}^{UL}(k) \right)^*.$$

Received Signal Gain Control Method for D2DDSS and/or PD2DSCH Reception

Hereinafter, an efficient automatic gain control (AGC) method for receiving a D2DSS and a PD2DSCH transmitted along therewith will be described.

In general, the operation range of a digital circuit for processing a baseband signal is restricted to a specific receive power range because a digital signal is expressed by a finite number of bits. Accordingly, if the power of an analog received signal is very large or small, when the analog received signal is sampled without change and is applied to the digital circuit, all signal components are not in the operation range and, as a result, the received signal is distorted, thereby decreasing performance. The AGC serves to adjust the receive power of the analog signal to be within the operation range via the process of amplifying gain and, for example, amplifies small (or large) gain to generate a signal with power within the operation range of the digital circuit if the receive power of the analog signal is very large (or very small). For example, in a state in which bandwidth is 100 RBs, when the receive power of the analog signal is X and the receive power per RB suitable for the digital circuit is Y, the gain of the AGC may be set to Y*100/X. At this time, assume that the receive power X of the analog signal observed in the time domain is distributed in all RBs with uniform power spectral density. Since the UE does not generally know to which RB the signal is applied, before performing digital processing including FFT, the existing operation may be regarded as being appropriate in reception of the signal without preliminary knowledge of signal transmission bandwidth.

However, the D2DSS and the PD2DSCH are always transmitted at specific RBs, for example, 6 RBs located at the center of the bandwidth, in order to fix the location of the frequency resources to facilitate synchronization signal detection which is a first step of signal reception. In this state, when the AGC assuming the uniform PSD in the entire band is maintained, in the RB on which the D2DSS/PD2DSCH is actually transmitted, on the assumption that the power of the signal is 0 in another RB, power per RB is Y*100/6 and a phenomenon wherein a signal with power higher than Y, which is power per RB, by 100/6=12.2 dB is applied to the digital circuit occurs. As a result of such a difference, the digital processing performance of D2DSS/PD2DSCH may deteriorate. In particular, transmission of other D2D signals may be prohibited in order to protect such a signal in the subframe in which the D2DSS/PD2DSCH may be transmitted. In this case, if the center RBs are excluded, since a probability that no signal is transmitted is high, the above-described problems may further occur.

As a method of solving such problems, when the D2DSS/PD2DSCH is received, an additional amplifier is applicable in addition to the existing AGC as shown in FIG. 6. The amplifier having gain of −12.2 dB is added such that power per RB in the D2DSS/PD2DSCH transmission RB is adjusted to Y. Such an additional amplifier may be implemented to adjust target power in the AGC, for example, to change Y to Y*6/100 upon receiving the D2DSS/PD2DSCH.

Figure 15:
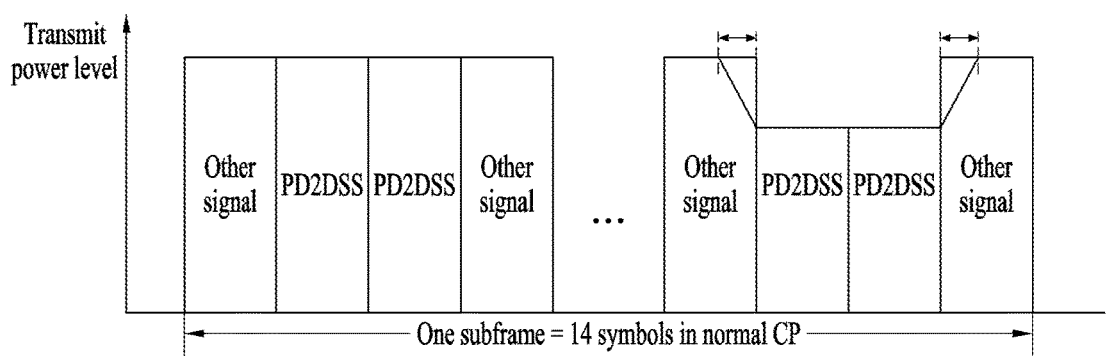

As shown in FIG. 6, a DMRS is transmitted in a state of concatenating an SD2DSS. At this time, power backoff is applicable to the transmit power of the SD2DSS due to PAPR. FIG. 15 shows an embodiment of a power mask when power backoff is applied to the SD2DSS. When a transient interval occurs in a DMRS by applying power backoff, measurement or channel estimation of a PD2DSCH may be adversely affected. In order to prevent this, a digital pre-distortion scheme for estimating occurrence of the power amplifier transient interval in a digital stage and applying predistortion may be used. For example, a time-domain digital sample may be multiplied by the distortion gain shown in Equation 14 below.

$$\bar{t}_n^{(i)} = \frac{1}{\hat{g}_n} t_n^{(i)}, n = -N_{CP}, \cdots, N-1 \quad \text{Equation 14}$$

Where, $\bar{t}_n^{(i)}$ a time domain sample after DPD, $t_n^{(i)}$ denotes a time domain sample before DPD, and $\hat{g}_n$ denotes an estimated PA response. FIG. 16(a) shows the concept of signal power when applying DPD (method of distorting the digital pre-distortion analog amplifier in the digital stage in the form of an inverse function of an analog amplifier response, because the digital pre-distortion analog amplifier is not actually linear). In FIG. 16(a), DPD is applied in a digital domain in preparation for power increasing in a next symbol. FIG. 16(b) is a block diagram when applying DPD. This may be used as a method for compensating for distortion in a power transient interval when a power difference occurs between symbols.

Examples of the above-described methods may be included as one of the implementations of the present invention and thus may be regarded as proposed methods. In addition, the above-described methods may be independently implemented or some of the proposed methods may be combined (or merged). Rules may be defined such that information regarding whether the proposed methods are applied (or information on the rules of the proposed methods) may be signaled from the eNB to the UE via a predefined signal (e.g., a physical layer signal or a higher layer signal).

According to the present invention, it is possible to detect a synchronization signal using a minimum number of correlators in an initial carrier frequency offset environment.

Configurations of Devices for Embodiments of the Present Invention

Figure 17:
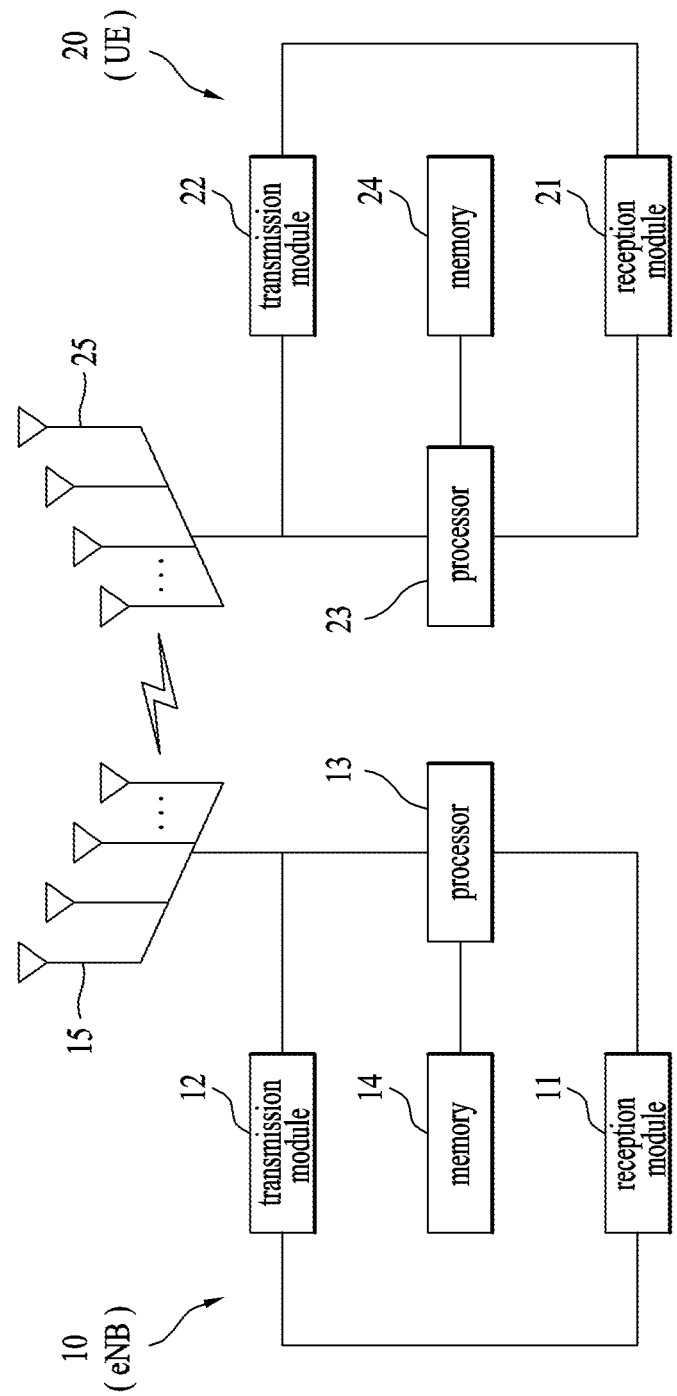
FIG. 17 is a diagram showing the configuration of transmission and reception apparatuses.

FIG. 17 is a diagram illustrating configuration of a transmit point apparatus and a UE according to one embodiment of the present invention.

Referring to FIG. 17, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 17, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 17 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of detecting a synchronization signal at a device-to-device (D2D) user equipment (UE) in a wireless communication system, the method comprising:
   receiving a primary sidelink synchronization signal (PSSS); and
   detecting the synchronization signal by performing correlation per each of hypothesis test levels via one correlator by using a per hypothesis test level shifted first sequence, a per hypothesis test level shifted second sequence having a complex conjugate relation in a predetermined normalized carrier frequency offset (CFO) from an initial CFO value and the received PSSS when the number of hypothesis test levels is greater than 1.

2. The method according to claim 1, wherein the shifted first sequence and the shifted second sequence satisfy the following equation:

$$e^{j\frac{2\pi k(1-\alpha)}{N}} D_{37}^{UL}(k) = \left(e^{j\frac{2\pi k \cdot \alpha}{N}} D_{26}^{UL}(k)\right)^*,$$

where $D_{26}^{UL}(k)$ denotes the first sequence, $D_{37}^{UL}(k)$ denotes the second sequence, and $\alpha$ denotes a value of the normalized CFO.

3. The method according to claim 1, wherein the first and second sequences shifted by a smallest value among the hypothesis test levels are correlated via different correlators.

4. The method according to claim 1, wherein the initial CFO value is determined according to bandwidth used for D2D signal transmission.

5. The method according to claim 4, wherein the normalized CFO corresponds to a subcarrier spacing of the initial CFO.

6. The method according to claim 5, wherein the hypothesis test level is an integer in a range of the normalized CFO.

7. A device-to-device (D2D) user equipment (UE) apparatus for detecting a synchronization signal in a wireless communication system, the D2D UE apparatus comprising:
   a reception device; and
   a processor,
   wherein the processor is configured to:
   control the reception device to receive a primary sidelink synchronization signal (PSSS), and
   detect the synchronization signal by performing correlation per each of hypothesis test levels via one correlator by using a per hypothesis test level shifted first sequence, a per hypothesis test level shifted second sequence having a complex conjugate relation in a predetermined normalized carrier frequency offset (CFO) value and the received PSSS when the number of hypothesis test levels is greater than 1.

8. The D2D UE apparatus according to claim 7, wherein the shifted first sequence and the shifted second sequence satisfy the following equation:

$$e^{j\frac{2\pi k(1-\alpha)}{N}}D_{37}^{UL}(k) = \left(e^{j\frac{2\pi k \cdot \alpha}{N}}D_{26}^{UL}(k)\right)^*,$$

where $D_{26}^{UL}(k)$ denotes the first sequence, $D_{37}^{UL}(k)$ denotes the second sequence, and $\alpha$ denotes a value of the normalized CFO value.

9. The D2D UE apparatus according to claim 7, wherein the first and second sequences shifted by a smallest value among the hypothesis test levels are correlated via different correlators.

10. The D2D UE apparatus according to claim 7, wherein the initial CFO value is determined according to a bandwidth used for D2D signal transmission.

11. The D2D UE apparatus according to claim 10, wherein the normalized CFO corresponds to a subcarrier spacing of the initial CFO.

12. The D2D UE apparatus according to claim 11, wherein the hypothesis test level is an integer in a range of the normalized CFO.

* * * * *